United States Patent [19]

Magomedov

[11] Patent Number: 5,517,099
[45] Date of Patent: May 14, 1996

[54] METHOD AND APPARATUS FOR ROBUST INTEGRAL-PULSE CONTROL OF A SERVODRIVE OF UNKNOWN DYNAMICS

[75] Inventor: Magomed K. Magomedov, Dagestan, Russian Federation

[73] Assignee: International Modern Technologies, Inc., New York, N.Y.

[21] Appl. No.: 249,329

[22] Filed: May 26, 1994

Related U.S. Application Data

[63] Continuation-in-part of Ser. No. 77,674, Jun. 15, 1993, abandoned.

[51] Int. Cl.$^6$ ........................................... H02P 5/41
[52] U.S. Cl. ........................... 318/599; 318/606; 318/808; 318/810
[58] Field of Search ........................ 318/560, 566, 318/568.17, 568.18, 599, 606–610, 807–811

[56] References Cited

U.S. PATENT DOCUMENTS

| | | | |
|---|---|---|---|
| 4,138,632 | 2/1979 | Pauwels | 318/599 |
| 4,366,422 | 12/1982 | Rhodes | 318/561 |
| 4,409,531 | 10/1983 | Bjurstrom | 318/631 |
| 4,491,776 | 1/1985 | Veale | 318/561 |
| 4,574,227 | 3/1986 | Herder | 318/594 |
| 4,628,314 | 12/1986 | Morinaga | 340/870.24 |
| 4,675,589 | 6/1987 | Sausner | 318/599 |
| 4,743,821 | 5/1988 | Hall | 318/599 |
| 4,749,927 | 1/1988 | Rodal | 318/599 |
| 4,755,729 | 7/1988 | Gotou | 318/318 |
| 4,769,582 | 9/1988 | Crucq | 318/345 |
| 4,772,833 | 9/1988 | Tanaka | 318/599 |
| 4,794,312 | 12/1988 | Kano | 318/599 |
| 4,823,056 | 4/1989 | Wantanabe | 318/341 |
| 4,851,755 | 7/1989 | Fincher | 318/696 |
| 4,893,068 | 1/1990 | Evans | 318/615 |
| 4,910,447 | 3/1990 | Masters | 318/599 |
| 4,942,346 | 7/1990 | Ardit | 318/280 |

(List continued on next page.)

OTHER PUBLICATIONS

Robust Frame Synchronization For Noisy PCM Systems By David E. Dodds, IEEE Transactions on Communications, vol. COM–33 No. 5, May 1985.
Physical Review Letters, vol. 64, No. 8, Feb. 19, 1990.

*Primary Examiner*—Brian Sircus
*Attorney, Agent, or Firm*—Steven Horowitz

[57] ABSTRACT

Method and apparatus for robust integral-pulse control of servodrives of unknown dynamics. According to the current value of the controlled object position, a microprocessor controller presets the current values of pulse duration and pulse amplitude as functions of the position control or velocity control error. The current value of the pulse period is a function of the sum of (difference between) the current values of orthogonality and robustness parameters when the object moves with acceleration (when the object moves with deceleration). The orthogonality parameter is calculated in proportion to the current value of pulse duration under the condition of orthogonality of the adjacent pulses and the Indeterminacy Principle. The robustness parameter is a function of the current object acceleration/deceleration. Throughout each control period, additional modulations of pulse amplitude and pulse duration are employed whose frequencies are preset by a microprocessor controller for each control period as functions of the controlled object's current acceleration/deceleration and which are limited by these parameters' values in the current and previous control periods calculated as functions of the position control or velocity control error. The modulation steps of the pulse amplitude and pulse duration derived from additional modulation are calculated in proportion to the difference between the current position value of the controlled object and this parameter's value in the previous control period. The microprocessor outputs codes of current values of pulse amplitude, duration and period and transmits them to the amplifier. The pulse sequence is performed and applied to the electromotor.

6 Claims, 6 Drawing Sheets

U.S. PATENT DOCUMENTS

| | | | |
|---|---|---|---|
| 4,950,968 | 8/1990 | Ogura | 318/599 |
| 4,965,501 | 10/1990 | Hashimoto | 318/595 |
| 4,999,556 | 3/1991 | Masters | 318/599 |
| 5,006,770 | 4/1991 | Sakamoto | 318/561 |
| 5,038,090 | 8/1991 | Kawabata | 318/721 |
| 5,063,454 | 11/1991 | Hashimoto | 318/561 |
| 5,105,135 | 4/1992 | Nashiki et al. | 318/568.18 X |
| 5,126,894 | 6/1992 | Kawasaki | 360/73.11 |
| 5,132,599 | 7/1992 | Kono | 318/618 |
| 5,151,639 | 9/1992 | Hasegawa et al. | 318/568.18 |
| 5,162,987 | 11/1992 | Sambhu | 364/162 |
| 5,173,647 | 12/1992 | Hashimoto | 318/561 |
| 5,241,251 | 8/1993 | Wakui | 318/599 |

METHOD AND APPARATUS FOR ROBUST INTEGRAL-PULSE CONTROL OF A SERVODRIVE OF UNKNOWN DYNAMICS

This application is filed pursuant to 37 CFR Section 1.53(b) as a continuation-in-part application of application Ser. No. 08/077674 filed Jun. 15, 1993, abandoned.

BACKGROUND OF THE INVENTION

This invention relates to a control systems for servodrives of unknown dynamics having alternating inertial loads, Coriolis acceleration and unexpected disturbances. In particular, the present invention can be used in robotics, antenna and telescope drives, vehicle control and other systems. The main problems in designing control systems for servodrives of unknown dynamics are known to be (i) ensuring servosystem robustness, i.e. resistance or immunity to external disturbance; (ii) attaining high dynamic quality performance with respect to such factors as stability, degree of overshooting and transient process fading time; and (iii) minimizing power expenditure for the control and elimination of various vibratory effects and audible noise.

In most known methods and apparatuses for control of a servomotor, in particular where a direct current ("DC") motor is used (i.e. U.S. Pat. No. 4,749,927), the Pulse-Width Modulation ("PWM") method is commonly employed for generating servodrive control signals, where the duration of a control pulses $\tau_i$ is modulated in accordance with the current value of control error signal $\Delta X_i$. Moreover, the pulse period $T_p$ is specified as constant during the control cycle $T_c$ and is usually selected in accordance with loss tolerance in the switching stages of the power amplifier and ability to satisfy the following relation:

$$T_p < K_p T_{em}$$

where:

$K_p$—proportionality factor ($8 \leq K_p \leq 12$), and
$T_{em}$—electromotor electromechanical time constant satisfying $$T_{em} = (J_p R_r)/(C_e C_m) \quad (1)$$

where:

$J_p$—equivalent moment of inertia about the electromotor rotation axis;
$R_r$—electromotor rotor chain resistance;
$C_e$, $C_m$,—electric and magnetic constants.

The pulse amplitude "A" is also a selected constant and is equal to the nominal value of the electromotor power voltage. In some case, such an approach could provide sufficiently high dynamic quality performance when there is a constant load on the electromotor shaft. Even in this case, however, if A is constant, redundant power expenditure would be utilized for controlling the object.

It is known that in the functional diagram of digital control of a servodrive, the D.C. motor is usually considered as an aperiodic link that is equivalent to a Lowpass electromechanical Filter (LPF) with a transfer function of the following type:

$$W(P) = K_m/(T_{em}P+1) \quad (2)$$

where:

$K_m$—amplifying coefficient,
P—Laplace operator,
$T_{em}$—electromechanical time constant.

When two consecutive pulses u(t) and v(t), with equal durations $\tau$ and spectrum densities $S_o$ (see FIG. 1) are applied to this Lowpass electromechanical Filter, the total energy E applied to the LPF input is shown by the following equation:

$$E = \int_{-\infty}^{+\infty} (U+V)^2 dt = E_u + E_v + E_{uv} \quad (3)$$

where:

$E_u$, $E_v$ represent the energy of u(t) and v(t) signals respectively, and $$E_{uv} = 2 \int_{-\infty}^{+\infty} (UV) dt$$

is the interaction energy of the signals

It is known, that the high frequency portion of the signals' interaction energy usually reduces the quality of the transient processes preceding in the electric drive in that the degree of overshooting and the transient process fading time increase and parasitic vibrations and noise disturbances appear, especially at low velocities. FIG. 2 depicts the impulse response of the LPF over time, when signals u(t) and v(t) are applied.

When a traditional PWM is used, the above effects increase even more as duration of the controlling pulses is decreasing when the servodrive approaches the preset control point, and when in accordance with the Indeterminacy Principle, $w_u \tau \geq 1/\pi$, the pulse frequency spectrum is extended. Hence, the smaller part of applied energy concentrates in the transmission band of a LPF. For an electric drive this means that the part of the useful energy which provides the motor rotation decreases and the parasitic effects (e.g., thermal, vibratory, noise) increase. This process is especially aggravated when the moment of inertia about the motor shaft changes due to the load changes, which causes corresponding changes of the transmission band of the LPF. In this case the robustness of the system is also not provided.

Moreover, when the pulse duration is changing at constant values of $T_p$ and A, the current ripple coefficient of the electromotor also changes, which causes velocity pulsation.

There have been attempts to solve the above problems through the addition of various means, e.g. the addition of a feedforward control as in U.S. Pat. No. 5,107,193. These attempts, however, do not maintain the robustness of the system and do not decrease power expenditure utilized for control of the unknown movement dynamics of the controlled object, since a traditional PWM with constant $T_p$ and A is also utilized in that case (U.S. Pat. No. 5,107,193).

SUMMARY OF THE INVENTION

An object of the present invention is to provide high quality control performance for a servosystem with unknown dynamics while minimizing power consumption used to realize such control.

Another object of the present invention is to provide high control precision of the above servosystem with unknown dynamics within a wide range of velocities of the controlled object while achieving a high degree of servosystem robustness.

A further object of the present invention is to eliminate the various kinds of vibratory effects and audible noise which can appear in the servosystem.

In order to achieve these and other objects in the system with a pulse controlled electromotor, it is proposed to accomplish not only pulse duration modulation, as in traditional PWM, but additionally to modulate in a corresponding way the pulse amplitude and pulse period for each control period. Throughout the control cycle, according to the current value of the controlled object position, a microprocessor controller presets the current values of pulse duration and pulse amplitude as functions of the position control error or as functions of the velocity control error (when velocity control of the controlled object is required). Throughout the control cycle, the current value of the pulse period is determined as a function of the sum of the current values of orthogonality and robustness parameters when the object moves with acceleration and is determined as a function of the difference between the current values of orthogonality and robustness parameters when the object moves with deceleration. The current value of the orthogonality parameter is calculated for each control period in proportion to the current value of pulse duration under the condition of orthogonality of the adjacent pulses and the Indeterminacy Principle. The current value of the robustness parameter is determined as a function of the current object acceleration, or deceleration as the case may be.

"Control period" as used here means the time between two consecutive readings of actual position of the controlled object. The "control cycle" is the sum of all the control periods during which the controlled object is affected. The "current value" of a parameter is the value of that parameter at the particular point in time during the control cycle which would correspond to the then current time, as distinguished from the then past or the then future time.

Throughout each control period, additional modulations of pulse amplitude and pulse duration are employed. The frequencies of these modulations are preset by a microprocessor controller for each control period as functions of the controlled object's current acceleration, or deceleration as the case may be. The above modulations of pulse amplitude and pulse duration are limited by the values of these parameters in the current control period and the values of these parameters in the previous control period calculated as functions of the position control error or the velocity control error. Moreover the above modulation is performed in such a way that the increments or decrements (the modulation steps) of the pulse amplitude and pulse duration derived from additional modulation are calculated in proportion to the difference between the current position value of the controlled object and the value of this parameter in the previous control period.

Throughout each control period, the microprocessor controller outputs the codes of the current values of the main variables of the pulse sequence, such as: pulse amplitude (modulated with the frequency proportional to the current acceleration/deceleration throughout each control period), pulse duration (modulated with the frequency proportional to the current acceleration/deceleration throughout each control period) and pulse period. After the codes of the current values of these main variables are processed they are transmitted to their respective inputs of the power amplifier, performed, for example in a bridge design circuit, whereupon each of the respective pulse sequences ("Integral-Pulse [IP] sequences") that is formed from the output of the power amplifier is applied to electromotor.

DETAILED DESCRIPTION

The above mentioned and other objects and advantages of the present invention will become clear from the following detailed description of the preferred embodiment of the present invention and from the accompanied drawings.

Figure 1:
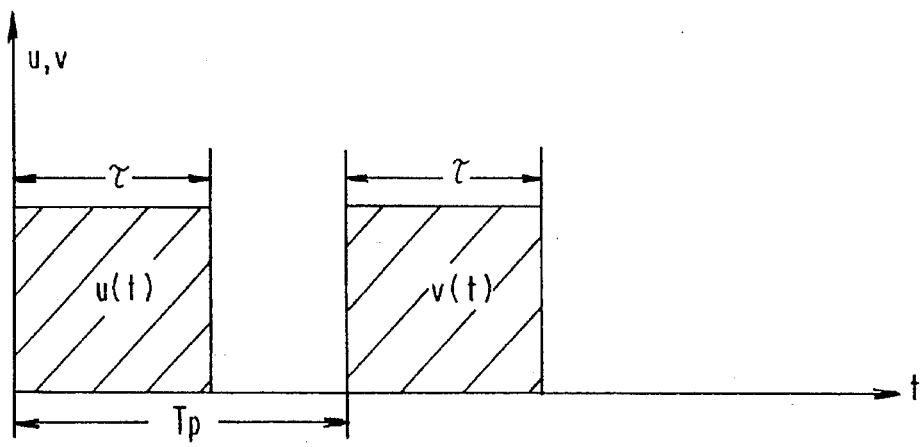
FIG. 1 is a time diagram of two sequential pulses having equal durations and spectrum densities applied to a lowpass electromechanical filter (LPF).

FIG. 1 depicts two sequential pulses having equal durations and spectrum densities applied to the LPF.

Figure 2:
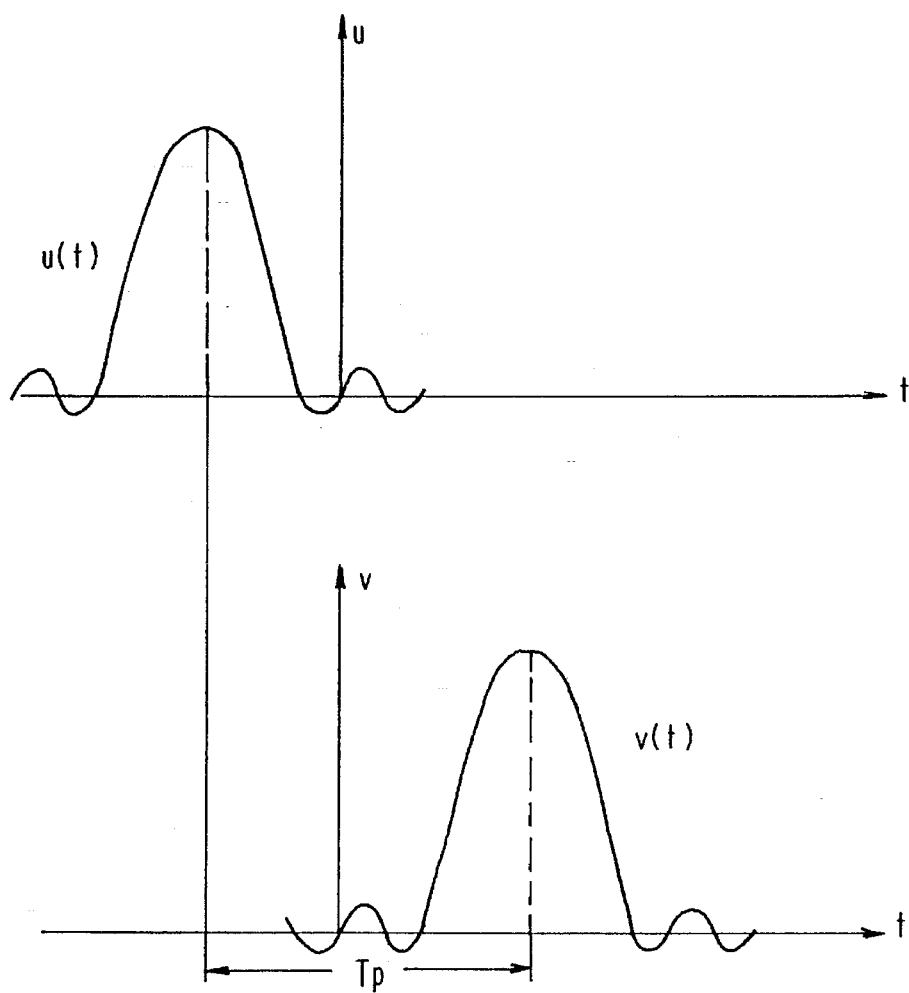
FIG. 2 is a time diagram showing the Impulse Response of the LPF while signals u(t) and v(t) are applied to a LPF.

FIG. 2 depicts the impulse response of the LPF over time, when signals u(t) and v(t) are applied.

Figure 3:
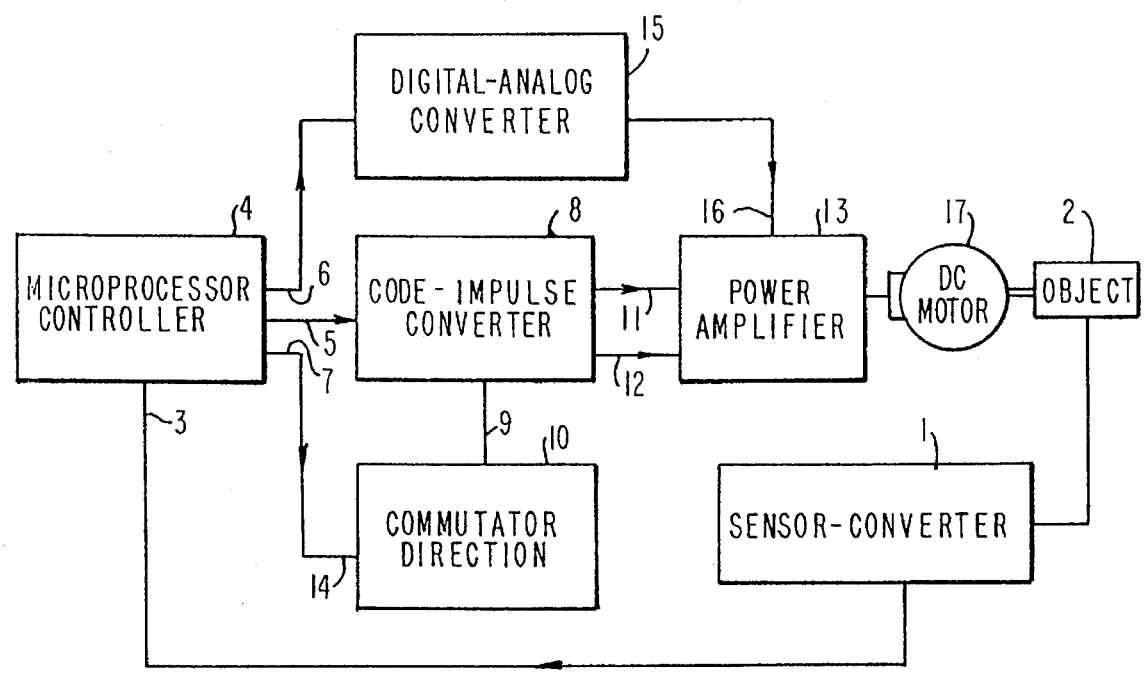
FIG. 3 is a structure diagram for explaining servodrive system design having the robust integral-pulse control.

FIG. 3 is a structure diagram of the proposed system design having robust servodrive control with an integral-pulse modulation which controls the pulse sequence.

As shown in FIG. 3, servo-converter (transducer) 1 reads the current value of the actual position of the controlled object 2 and transmits it to the input 3 of the microprocessor controller 4. The microprocessor controller 4 has three digital outputs:

on output 5 the code of current value of the pulse duration $\tau_{i,j}$, and the code of current value of the pulse period $T_{pi}$ are generated throughout each control period with frequency $f_{\tau i}$.

on output 6 the code of the current value of pulse amplitude $A_{i,j}$ is generated throughout each control period with frequency $f_{Ai}$.

on output 7 the code of the motor rotation direction is generated for each control period.

The codes representing time indices of the integral-pulse sequences are transmitted to the input of the "code-impulse" converter 8. Through input 9 of the commutator direction switch 10, the output of the code-impulse converter controls inputs 11 and 12, which are the "on" and "off" switches of the power amplifier 13. Input 14 of the commutator direction switch is controlled by the output 7 of the microprocessor controller.

The codes representing the amplitude indices of the integral-pulse sequences are transmitted to the input of the digital/analog converter 15, the output of which, after voltage amplification (not shown), is transmitted to the input 16 of the power amplifier. The power amplifier is performed in a bridge design circuit (not shown), one of the diagonals of which is connected to the DC motor rotor winding 17, on the shaft of which the controlled object is placed.

Figure 4A:
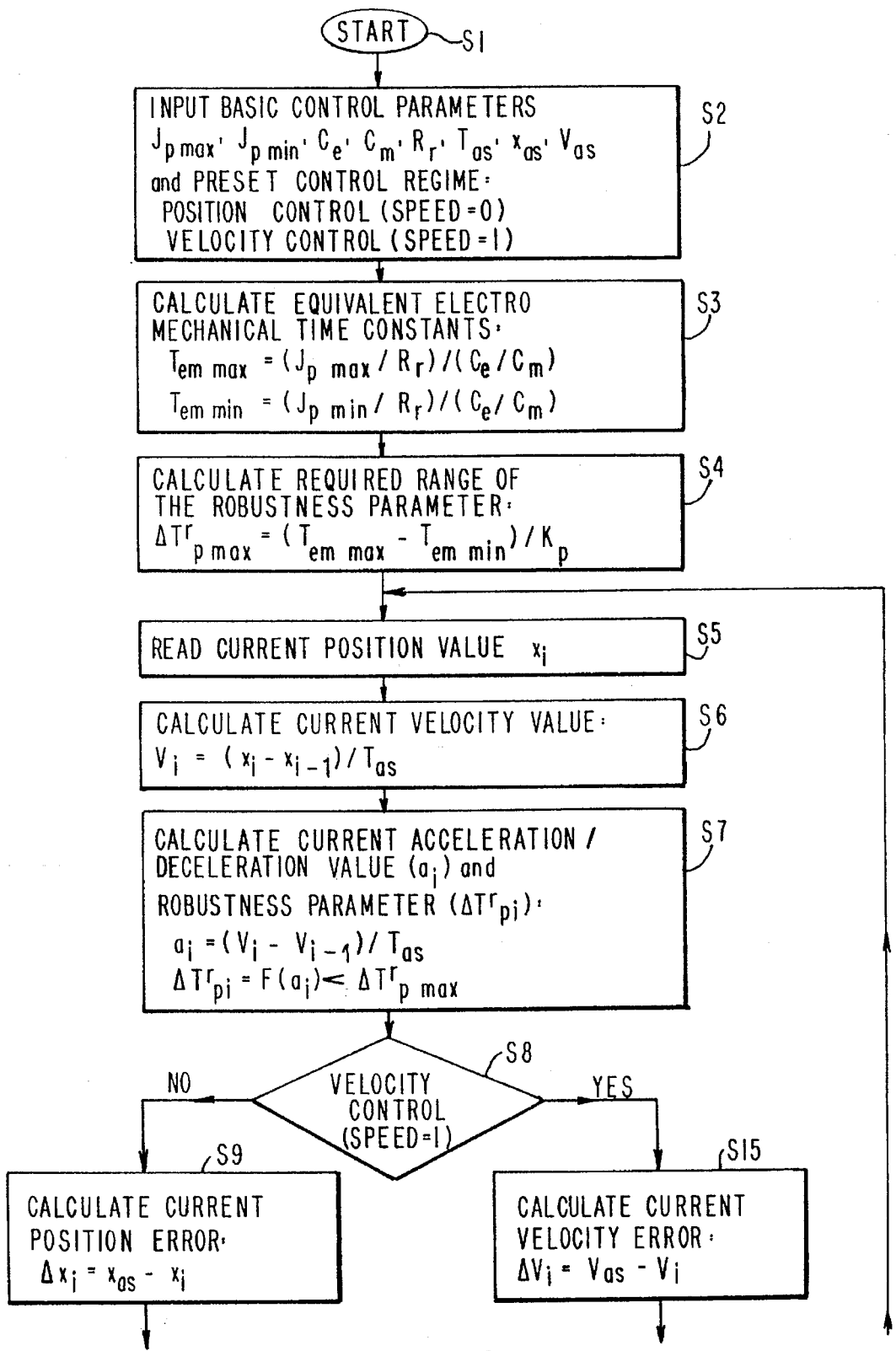
FIGS. 4A and 4B comprise a flow chart algorithm of integral-pulse sequence forming.
Figure 4B:
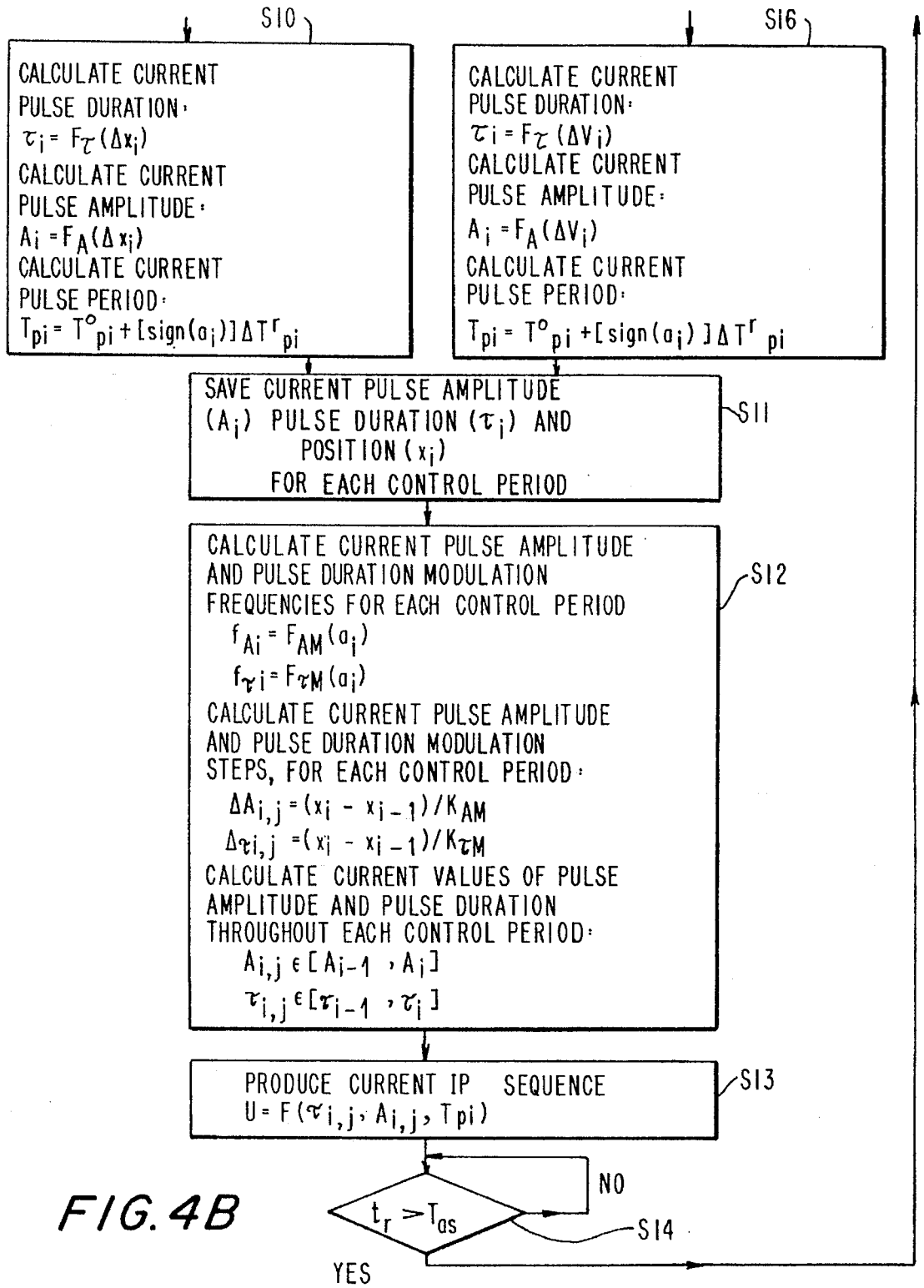

FIGS. 4A and 4B represent the algorithm of generating a pulse sequence with integral-pulse modulation by the microprocessor controller.

The basic parameters $J_{p\ max}$, $J_{p\ min}$, $C_e$, $C_m$, $R_r$, $T_{as}$, $X_{as}$, $V_{as}$ are input on Step S2. The maximum $J_{p\ max}$ and the minimum $J_{p\ min}$ values of the equivalent moment of inertia about the electromotor rotation axis due to the load changing, as well as the value of the control period duration $T_{as}$ (the time between two consecutive readings of actual position of the controlled object) are determined experimentally or in accordance with system performance requirements.

The $C_e$, $C_m$, $R_r$ parameters are data-sheet values of the electromotor. The ultimate position control parameter $X_{as}$ and the ultimate velocity control parameter $V_{as}$ are determined in accordance with system performance requirements.

The limiting electromechanical constants $T_{em\ min}$ and $T_{em\ max}$ in the terms of which the system robustness must be provided are calculated on Step S3, and the required range of robust control (robustness parameter) $\Delta T^r_{p\ max}$ is calculated on Step S4:

$$\Delta T^r_{p\ max} = (T_{em\ max} - T_{em\ min})/K_p \tag{4}$$

where $K_p$ is the constant of proportionality ($8 \leq K_p \leq 12$).

The current position value $X_i$ is read out from the transducer (sensor-converter) on Step S5 and the current values of velocity $V_i$, acceleration/deceleration $a_i$ and robustness parameter $\Delta T^r_{pi}$ are calculated on Step S6 and S7.

If the system performance requirements demand position control (Step S8), the current value of the position error $\Delta X_i$ is calculated on the following Step S9 of the algorithm and the binary codes of the current values of pulse duration $\tau_i$, pulse amplitude $A_i$ and pulse period $T_{pi}$ for control period (i) are calculated on Step S10 of the algorithm.

The value $\tau_i$ is determined as a function of the current value of the position error:

$$\tau_i = F_\tau(\Delta X_i),$$

In the simplest case, this function can be linear, i.e.

$$\tau_i = K_\tau \Delta X_i,$$

The form of the function $F_\tau$ and the value of $K_\tau$ parameter are determined by modelling or are determined experimentally.

In order to minimize power expenditure for control purposes, to minimize current ripple, as well as to improve the quality of the transient processes, especially at low velocities, it is proposed in the present invention to modulate pulse amplitude in each control period as a function of the current value of the position error:

$$A_i = F_A(\Delta X_i),$$

In the simplest case this function can be linear, i.e.:

$$A_i = K_A \Delta X_i,$$

The form of the function $F_A$ and the value of $K_A$ parameter are determined by modelling or are determined experimentally.

It is obvious that the acceleration, or deceleration as the case may be, of the controlled object is the main criteria of the load changes and the origin of the undetermined disturbances in the servosystem. Therefore, in the present invention, the current value of the robustness parameter is proposed to be determined (Step S7) as a function of the magnitude value of the acceleration/deceleration. Moreover, the current value of the robustness parameter must not exceed the maximum value of the robustness parameter determined in Step S4:

$$\Delta T^r_i = F_T|a_i| \leq \Delta T^r_{p\ max} \tag{5}$$

In the simplest case this function can be linear, i.e.

$$\Delta T^r_{pi} = K_T|a_i|$$

The form of the function $F_T$ and the value of $K_T$ parameter are determined by modelling or are determined experimentally.

On the other hand, as discussed in the Background of the Invention, in order to provide high quality of the control process and neutralize different parasitic effects, especially at low velocities of the controlled object movement, it is necessary to eliminate the influence of the high frequency portion of the interaction energy of the consecutive signals of the pulse sequence (condition of orthogonality) taking into account the extension of the pulse frequency spectrum when approaching the preset control point (in accordance with the Indeterminacy Principle).

In case the orthogonality condition for the signals u(t) and v(t) is fulfilled, their dot product and therefore their interaction energy must become zero:

$$(u,v) = \tag{6}$$

$$(S_0^2/2\pi) \int_{-w_u}^{+w_u} e^{(jw)} T_p dw = [(S_0^2 w_0)/\pi][\sin(w_u T_p)]/(w_u T_p) = 0$$

therefore:

$$\sin(W_u T_p) = 0$$

$$w_u T_p = k\pi \quad (k = \pm 1; \pm 2; \dots) \tag{7}$$

where $w_u$—upper limit frequency of the signal spectrum, $w_o$—limit frequency of the LPF j—complex variable.

Figure 5:
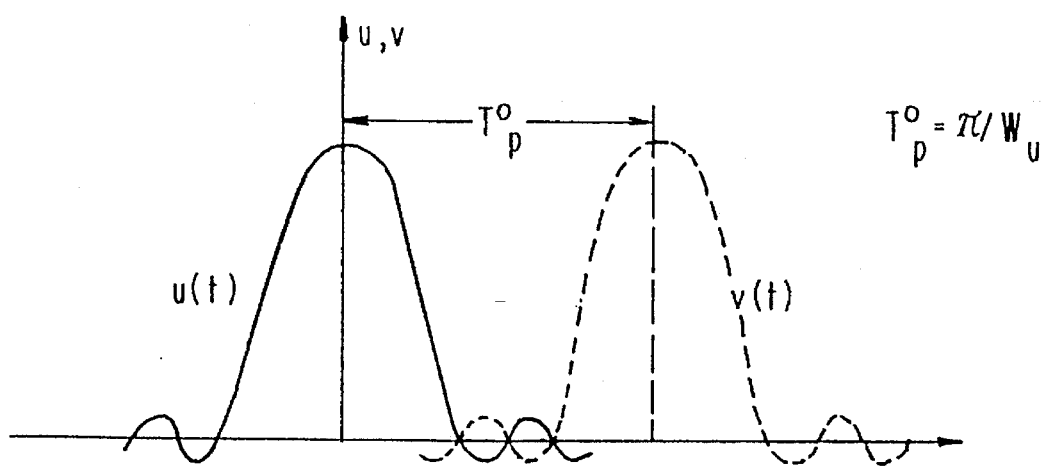
FIG. 5 depicts the Impulse Response of the LPF while orthogonal signals u(t) and v(t) are applied.

FIG. 5 represents the time chart of the LPF impulse response for this case and it is obvious that their total pulse characteristic will be completely positive and that therefore parasitic effects and additional power expenditures for servosystem control will be eliminated.

On the other hand, according to the Indeterminacy Principle:

$$w_u \tau \geq 1/\pi \tag{8}$$

The joint solution of (7) and (8) results in the following relation:

$$T^o_p \leq k\pi^2 \tau \tag{9}$$

where $T^o_p$ is the orthogonality parameter, meaning the pulse period portion, calculated in accordance with the orthogonality condition taking into account the Indeterminacy Principle.

The minimum current ripple in the electromotor rotor winding and the minimum power expenditure for controlling is provided at k=1. Therefore the current value of the pulse period portion (the orthogonality parameter) $T^o_{pi}$ could be connected with the current value of pulse duration by the following relation:

$$T^o_{pi} = K^o \tau_i \tag{10}$$

The value of the $K^o$ parameter is determined by modelling or experimentally and is limited by the range ($1.1 \leq K^o \leq \pi^2$)

Thus, in the preferred embodiment of the present invention the current value of the pulse period in robust servodrive control system with unknown dynamics is proposed to be selected (step S10 of the algorithm) taking into account (5) and (10) as follows:

$$T_{pi} = T^o_{pi} + [sign(a_i)]\Delta T^r_{pi}, \tag{11}$$

The first member of the right part of relation (11) is the orthogonality parameter which represents the current value of the orthogonal portion of the pulse period. The second member of the right part of relation (11) is the robustness parameter which represents the current value of the robust portion of the pulse period.

It should be obvious that in a complex system with unknown dynamics the selected values $\tau_i$ and $A_i$ can not always provide optimal control because of random factors which can not be presently determined. In order to increase the possibility of optimal tuning of the pulse sequence parameters and to overcome inertia and static friction of the servosystem, throughout each control period an auxiliary pulse duration modulation having frequency $f_{\tau i}$ and pulse amplitude modulation having frequency $f_{Ai}$ are set in Step S12 of the algorithm. The values of modulation frequencies $f_{Ai}$ and $f_{\tau i}$ are calculated as functions of the current value of acceleration/deceleration $a_i$ in Step S12 in accordance with the following equations:

$$f_{Ai} = F_{Am}(a_i)$$

$$f_{\tau i} = F_{\tau m}(a_i)$$

The form of the functions $F_{\tau m}$ and $F_{Am}$ are determined by modelling or are determined experimentally.

The ranges of the above modulations of pulse amplitude $A_{i,j}$ and pulse duration $\tau_{i,j}$ are set from the values of these parameters in the current control period $A_i$, $\tau_i$ to the values of these parameters in the previous control period $A_{i-1}$, $\tau_{i-1}$ in case of acceleration and vice versa in case of deceleration:

$$A_{i,j} \in [A_{i-1}, A_i]$$

$$\tau_{i,j} \in [\tau_{i-1}, \tau_i]$$

For this purpose values $A_i$ and $\tau_i$ are stored on Step S11.

The increments/decrements (modulation step) of pulse amplitude $\Delta A_{i,j}$ and pulse duration $\Delta \tau_{i,j}$ derived from the above modulation throughout each control period are proposed to be set in proportion to the difference between the current value of control object position $X_i$ and the value of this parameter in the previous control period $X_{i-1}$, (Step S12):

$$\Delta A_{i,j} = A_{i,j} - A_{i,j-1} = (X_i - X_{i-1})/K_{\Delta A} \quad (12)$$

$$\Delta \tau_{i,j} = \tau_{i,j} - \tau_{i,j-1} = (X_i - X_{i-1})/K_{\Delta \tau}$$

The values of $K_{\Delta A}$ and $K_{\Delta \tau}$ parameters are determined by modelling or experimentally, and must belong to the real numbers set—$K_{\Delta A} \in \{1, \infty\}$, $K_{\Delta \tau} \in \{1, \infty\}$.

For this purpose values Xi are stored on Step S11.

The codes of the current values for all integral-pulse sequence parameters throughout the control period (i) are finally generated on Step S13:
pulse duration ($\tau_{i,j}$)
pulse amplitude ($A_{i,j}$)
pulse period ($T_{pi}$)

The condition $t_r > iT_{as}$ is checked on Step S14. If the actual control time $t_r$ is out, reading out of the next value $\alpha_{(i+1)}$ from the transducer (servo-converter) is permitted. The cycle repeats until the current position value $X_i$ of the controlled object will achieve the command value $X_{as}$. In the event that velocity control is set (Step S8), instead of Steps S9 and S10 the algorithm also includes Steps S15 and S16.

Figure 6A:
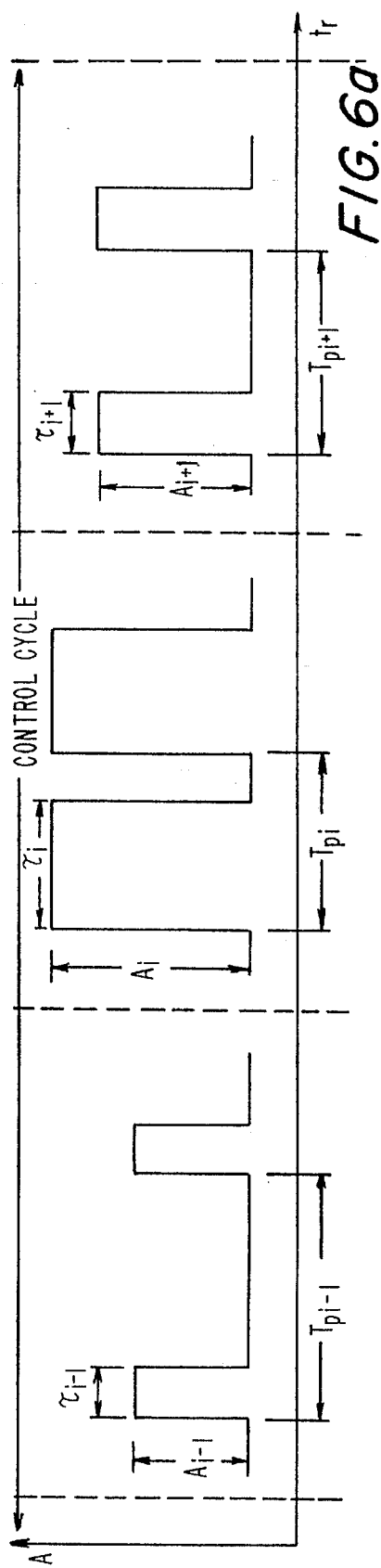
FIGS. 6A and 6B are time diagrams of the integral-pulse sequence forming.
Figure 6B:
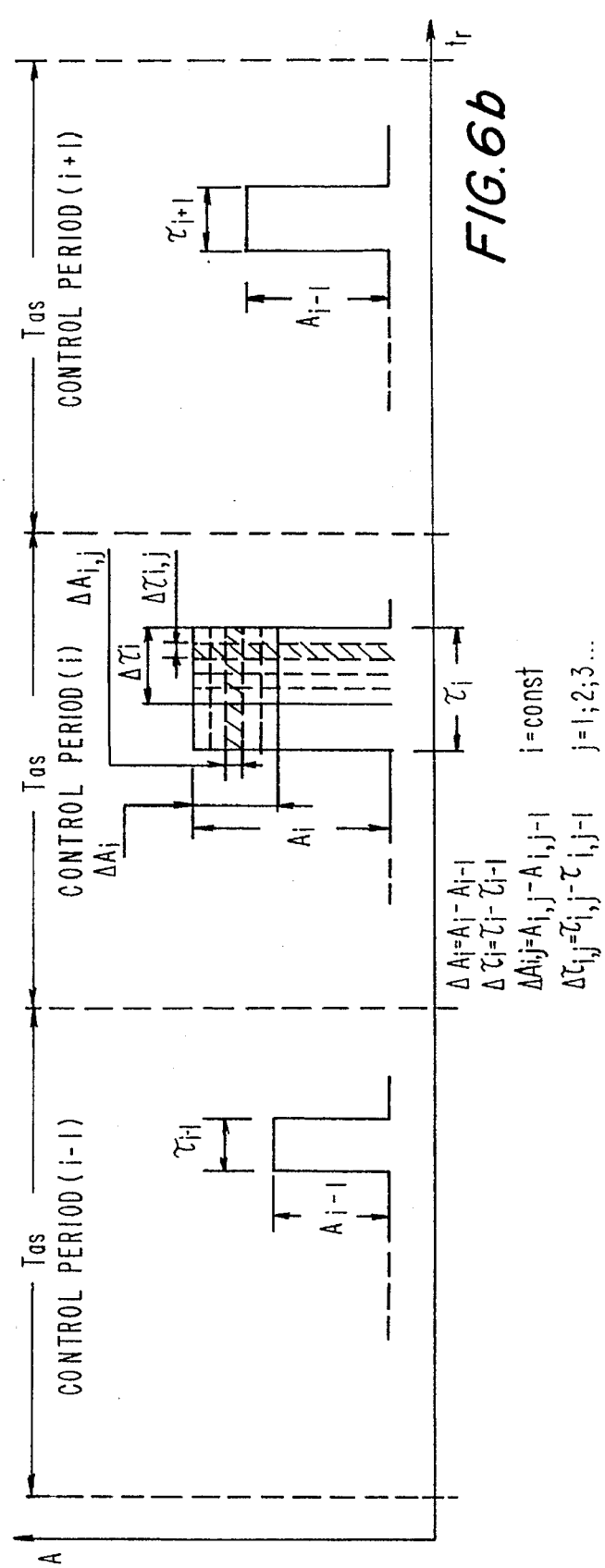

FIGS. 6A and 6B represent the temporal diagrams of IPM modulated pulses on output of power amplifier, without additional modulation (FIG. 6A), and with additional modulation for control period (i), as an example, (FIG. 6B).

While the method and apparatus of this invention have been described and illustrated in detail, it is to be clearly understood that this is intended by way of illustration and example only and not as a limitation on the invention. The spirit and scope of this invention are limited only by the terms of the following claims.

I claim:

1. A method of pulse modulation control of a servodrive comprising the steps of:

setting a required range of a robustness parameter for a control cycle in proportion to a difference between a maximum and a minimum value of an electromotor's electromechanical time constant, reading a current position value of a controlled object, calculating a current velocity value of said controlled object by determining a difference between said controlled object's position value in a current control period and its position value in a previous control period and dividing said difference by a control period time consisting of an amount of time that transpires between said two position values of said controlled object, calculating a current acceleration/deceleration value of said controlled object by determining a difference between said controlled object's velocity value in a current control period and its velocity value in the previous control period and dividing said difference by said control period time, calculating a current robustness parameter value for each control period in proportion to said current acceleration/deceleration value of said controlled object without exceeding an upper limit of the range of the robustness parameter for the control cycle, calculating a value for a current position error of the controlled object as a difference between a command position of the controlled object and said controlled object's actual current position, calculating for each control period a value for a current pulse duration that is proportional to the value of said controlled object's current position error, calculating for each control period a value for a current pulse amplitude that is proportional to the value of said controlled object's current position error, calculating for each control period a value for a current pulse period that is proportional,
when the controlled object is accelerating, to a sum of a current value of an orthogonality parameter calculated proportionally to said current pulse duration value, and the value of said current robustness parameter
and that is proportional, when the controlled object is decelerating, to a difference between a current value of an orthogonality parameter calculated proportionally to said current pulse duration value, and said current robustness parameter value, calculating for each control period current values of frequencies of additional modulations of pulse amplitude and pulse duration, for modulation ranges limited by said current values of pulse amplitude and pulse duration and limited by the values of said pulse amplitude and pulse duration calculated for the previous control period as then current values for that period, proportionally to said current value of acceleration/deceleration for each control period, and creating a sequence of controlling pulses using the current value of pulse period and said additionally modulated pulse amplitude and pulse duration, and feeding a resulting pulse sequence to the electromotor throughout each control period.

2. A method of pulse modulation control of a servodrive comprising the steps of:

setting a required range of a robustness parameter for a control cycle in proportion to a difference between a maximum and a minimum value of an electromotor's electromechanical time constant, reading a current position value of a controlled object, calculating a current velocity value of said controlled object by determining a difference between said controlled object's position value in a current control period and its position value in a previous control period and dividing said difference by a control period time consisting of an amount of time that transpires between said two position values of said controlled object, calculating a current acceleration/deceleration value of said controlled object by determining a difference between said controlled object's velocity value in the current control period and its velocity value in the previous control period and dividing said difference by said control period time, calculating a current robustness parameter value for each control period in proportion to said current acceleration/deceleration value of said controlled object without exceeding an upper limit of the range of the robustness parameter for the control cycle, calculating a value for a current velocity error of the controlled object as a difference between a command velocity of the controlled object and said controlled object's actual current velocity, calculating for each control period a value for a current pulse duration that is proportional to the value of said controlled object's current velocity error, calculating for each control period a value for a current pulse amplitude that is proportional to the value of said controlled object's current velocity error, calculating for each control period a value for a current pulse period that is proportional, when the controlled object is accelerating, to a sum of a current value of an orthogonality parameter calculated proportionally to said current pulse duration value, and the value of said current robustness parameter and that is proportional, when the controlled object is decelerating, to a difference between a current value of an orthogonality parameter calculated proportionally to said current pulse duration value, and said current robustness parameter value, calculating for each control period current values of frequencies of additional modulations of pulse amplitude and pulse duration, for modulation ranges limited by said current values of pulse amplitude and pulse duration and limited by the values of said pulse amplitude and pulse duration calculated for the previous control period as then current values for that period, proportionally to said current value of acceleration/deceleration for each control period, and creating a sequence of controlling pulses using the current value of pulse period and said additionally modulated pulse amplitude and pulse duration, and feeding a resulting pulse sequence to the electromotor throughout each control period.

3. A method of pulse modulation control of a servodrive, according to claims 1 or 2, wherein the modulation step of pulse amplitude and the modulation step of pulse duration derived throughout each control period are calculated in proportion to a difference between a value of said controlled object current position and a value of the controlled object's position in the previous control period for each control period.

4. An apparatus for pulse modulation control of a servodrive comprising:

means for setting a required range of a robustness parameter for a control cycle in proportion to a difference between a maximum and a minimum value of an electromotor's electromechanical time constant, means for reading a current position value of a controlled object, means for calculating a current velocity value of said controlled object by determining a difference between said controlled object's position value in a current control period and its position value in a previous control period and dividing said difference by a control period time consisting of an amount of time that transpires between said two position values of said controlled object, means for calculating a current acceleration/deceleration value of said controlled object by determining a difference between said controlled object's velocity value in a current control period and its velocity value in the previous control period and dividing said difference by said control period time, means for calculating a current robustness parameter value for each control period in proportion to said current acceleration/deceleration value of said controlled object without exceeding an upper limit of the range of the robustness parameter for the control cycle, means for calculating a value for a current position error of the controlled object as a difference between a command position of the controlled object and said controlled object's actual current position, means for calculating for each control period a value for a current pulse duration that is proportional to the value of said controlled object's current position error, means for calculating for each control period a value for a current pulse amplitude that is proportional to the value of said controlled object's current position error, means for calculating for each control period a value for a current pulse period that is proportional, when the controlled object is accelerating, to a sum of a current value of an orthogonality parameter calculated proportionally to said current pulse duration value, and the value of said current robustness parameter and that is proportional, when the controlled object is decelerating, to a difference between a current value of an orthogonality parameter calculated proportionally to said current pulse duration value, and said current robustness parameter value, means for calculating for each control period current values of frequencies of additional modulations of pulse amplitude and pulse duration, for modulation ranges limited by said current values of pulse amplitude and pulse duration and limited by the values of said pulse amplitude and pulse duration calculated for the previous control period as then current values for that period, proportionally to said current value of acceleration/deceleration for each control period, and means for creating a sequence of controlling pulses using the current value of pulse period and said additionally modulated pulse amplitude and pulse duration, and feeding a resulting pulse sequence to the electromotor throughout each control period.

5. An apparatus for pulse modulation control of a servo-drive comprising:

means for setting a required range of a robustness parameter for a control cycle in proportion to a difference between a maximum and a minimum value of an electromotor's electromechanical time constant, means for reading a current position value of a controlled object, means for calculating a current velocity value of said controlled object by determining a difference between said controlled object's position value in a current control period and its position value in a previous control period and dividing said difference by a control period time consisting of an amount of time that transpires between said two position values of said controlled object, means for calculating a current acceleration/deceleration value of said controlled object by determining a difference between said controlled object's velocity value in the current control period and its velocity value in the previous control period and dividing said difference by said control period time, means for calculating a current robustness parameter value for each control period in proportion to said current acceleration/deceleration value of said controlled object without exceeding an upper limit of the range of the robustness parameter for the control cycle, means for calculating a value for a current velocity error of the controlled object as a difference between a command velocity of the controlled object and said controlled object's actual current velocity, means for calculating for each control period a value for a current pulse duration that is proportional to the value of said controlled object's current velocity error, means for calculating for each control period a value for a current pulse amplitude that is proportional to the value of said controlled object's current velocity error, means for calculating for each control period a value for a current pulse period that is proportional, when the controlled object is accelerating, to a sum of a current value of an orthogonality parameter calculated proportionally to said current pulse duration value, and the value of said current robustness parameter and that is proportional, when the controlled object is decelerating, to a difference between a current value of an orthogonality parameter calculated proportionally to said current pulse duration value, and said current robustness parameter value, means for calculating for each control period current values of frequencies of additional modulations of pulse amplitude and pulse duration, for modulation ranges limited by said current values of pulse amplitude and pulse duration and limited by the values of said pulse amplitude and pulse duration calculated for the previous control period as then current values for that period, proportionally to said current value of acceleration/deceleration for each control period, and means for creating a sequence of controlling pulses using the current value of pulse period and said additionally modulated pulse amplitude and pulse duration, and feeding a resulting pulse sequence to the electromotor throughout each control period.

6. An apparatus for pulse modulation control of a servo-drive, according to claims 4 or 5, comprising in addition means for calculating modulation steps for additional modulation as derived for pulse amplitude and pulse duration throughout each control period in proportion to a difference between a value of a controlled object's current position and a value of said controlled object's position in the previous control period for each control period.

* * * * *